May 19, 1936.   W. H. BISHOP   2,041,281
SLIDING ROOF FOR VEHICLES
Filed Oct. 8, 1934   3 Sheets-Sheet 2
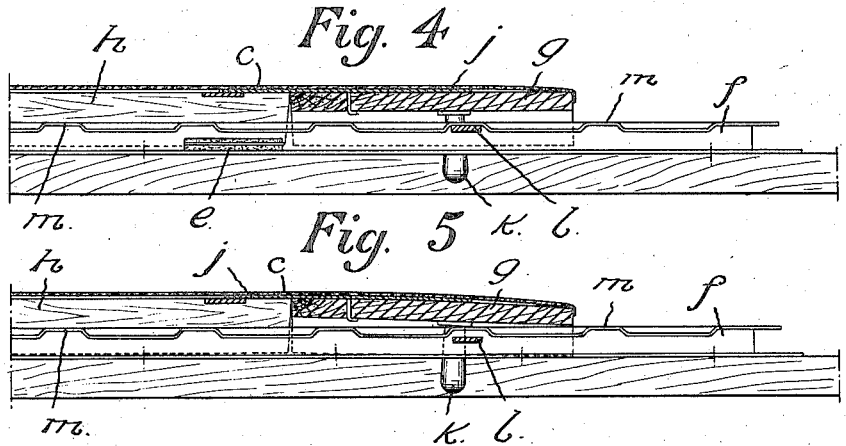
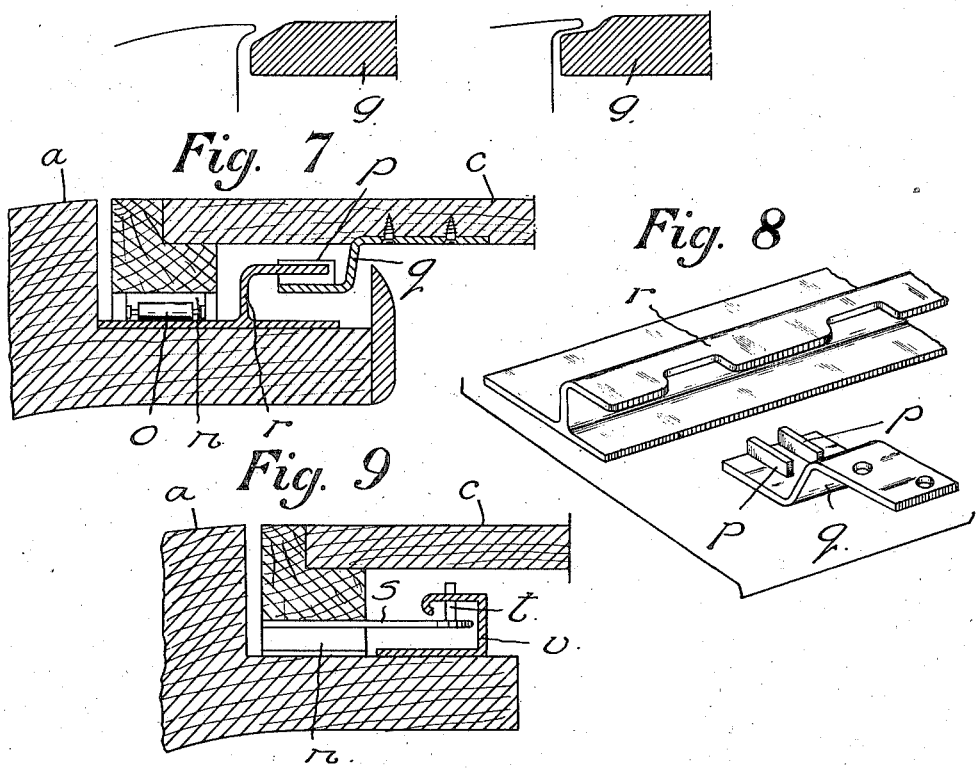
INVENTOR,
William Henry Bishop,
By Andrew Wilson,
Attorney.

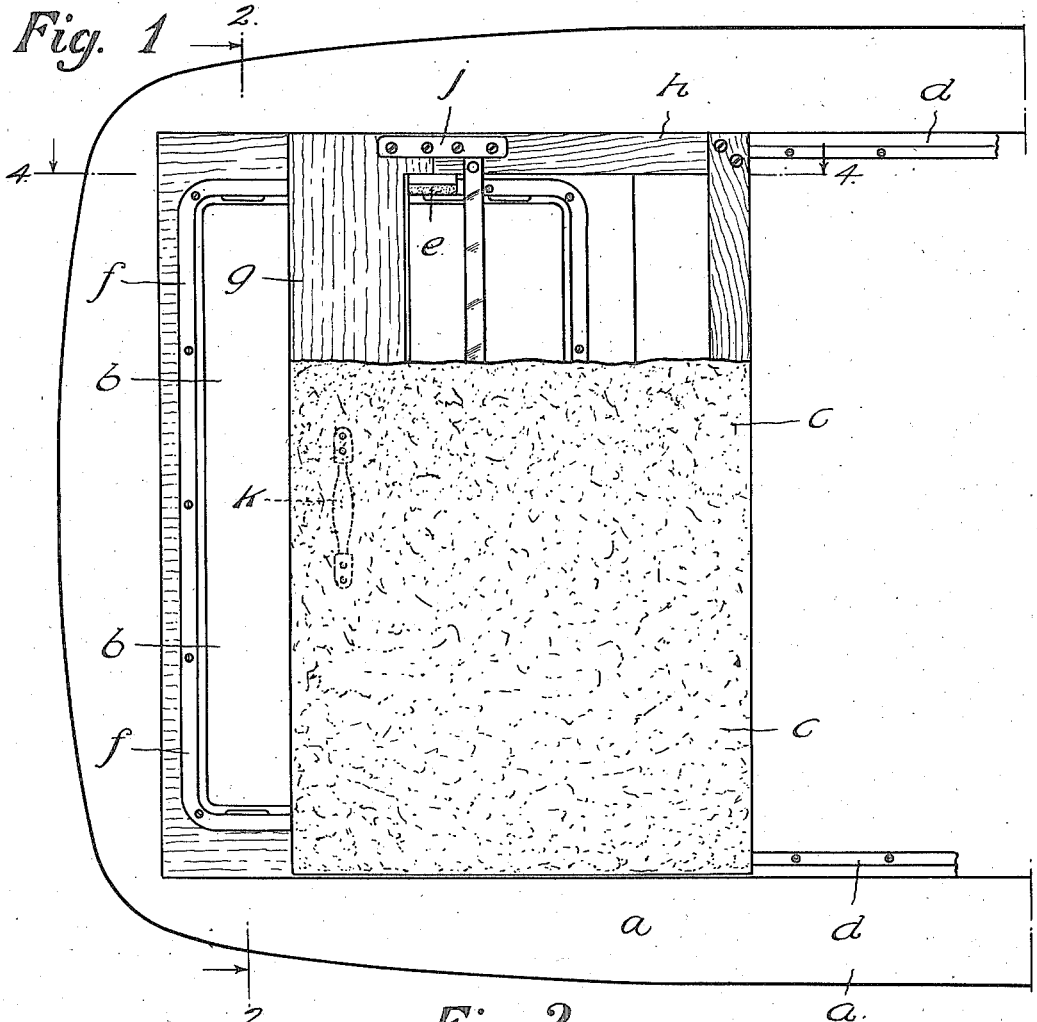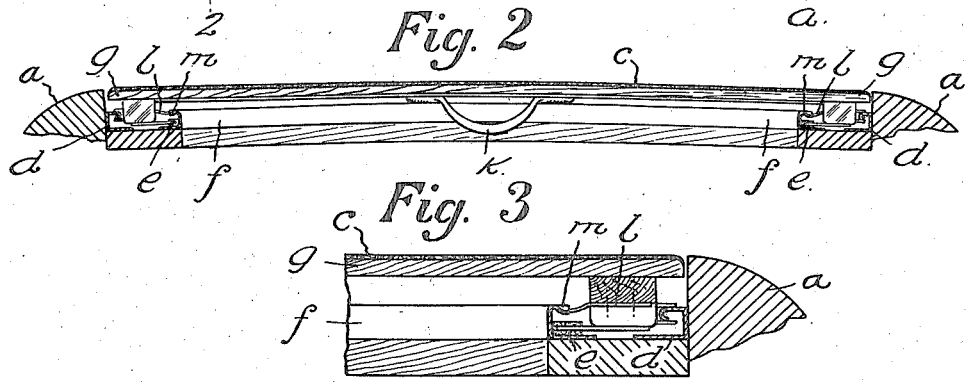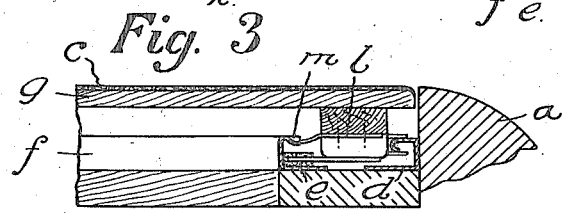

May 19, 1936.                W. H. BISHOP                2,041,281
                        SLIDING ROOF FOR VEHICLES
                   Filed Oct. 8, 1934          3 Sheets-Sheet 3

INVENTOR,
William Henry Bishop.
By Andrew A. Dixon
  Attorney.

Patented May 19, 1936

2,041,281

UNITED STATES PATENT OFFICE 2,041,281

SLIDING ROOF FOR VEHICLES

William Henry Bishop, Birmingham, England, assignor to Weathershields Limited, Birmingham, England Application October 8, 1934, Serial No. 747,348
In Great Britain April 12, 1934

4 Claims. (Cl. 296—137)

This invention relates to improvements in sliding roofs for vehicles such as saloon cars, motor-coaches, motor-boats, and cabin aeroplanes.

It is general practice to provide in the roof of a vehicle an opening adapted to be closed or to be uncovered to any desired extent by means of a longitudinally slidable panel, and it is common to provide some means for locking or holding the panel in any desired position, such means usually consisting of screw-operated clamping devices at each side of the panel or of locking catches operated from a central handle.

The object of my invention is to provide an improved form of sliding roof which is locked automatically in any position in which it is set without any operation other than the normal sliding movement, the automatic locking means being extremely simple so that production and fitting costs are reduced to a minimum and there are no parts liable to require adjustment or to get out of order in use.

According to my invention a sliding panel is so mounted that the panel or a part of it has a limited vertical movement in relation to its guides and this vertical movement is employed to cause engagement or disengagement of locking means arranged at one or both sides of the panel.

For example the side edges of the panel may normally be pressed upwardly by flat blade springs or the like in which position catches at the sides of the panel engage with notches, slots or recesses in longitudinal members which may be the guides on which the panel slides or may be separate members.

To move the panel it is drawn downwardly by means of the usual handle provided for moving it whereupon the catches are disengaged and the panel can be slid backwardly or forwardly into any desired position, the catches engaging again as soon as the panel is released and locking the panel in the position into which it has been moved.

As the panel is usually operated by the driver or by a passenger in the front seat of the vehicle the natural pull on the handle to open or close the panel is downward as well as longitudinal so that the locking device is automatically disengaged when the handle is grasped, no separate downward pull being normally necessary.

Instead of the whole panel being drawn downwardly to disengage the locking device the front part of the panel carrying the operating handle may be resiliently connected to the remainder of the panel frame so that only the front part has a vertical movement.

If desired the action can be reversed, the panel being normally pressed downwardly by the springs or by gravity and the catches being released by upward pressure on the panel but the other arrangement is preferred.

Some practical forms of our invention are illustrated by way of example in the accompanying drawings in which:—

Figure 1 is a plan in part section of a sliding panel for a vehicle roof embodying my invention.

Figure 2 is a section on the line 2—2 of Figure 1.

Figure 3 is an enlarged detail of one end of the section in Figure 2.

Figures 4 and 5 are fragmentary longitudinal sections on the line 4—4 of Figure 1 showing the panel in the locked and unlocked positions respectively.

Figure 6 shows diagrammatically in section two methods of sealing the front end of the panel in the closed position.

Figure 7 is a fragmentary section of an alternative form of locking device.

Figure 8 is a perspective view of the component parts of the locking device.

Figures 9 and 10 are respectively a fragmentary section and perspective view of another form of locking device.

In the form of my invention illustrated in Figures 1 to 5 $a$ is a vehicle roof in which is an opening $b$ adapted to be closed or uncovered by a longitudinally sildable panel $c$. The rear end of the panel is guided in channels $d$ arranged along the sides of a recess in the roof, and the front is guided by means of felt covered sliders $e$ travelling in the side members of a channel section water-check frame $f$ fitting around the opening in the roof. The sliding panel consists of a fabric or other covering stretched over a rectangular frame of which the front cross-member $g$ is connected to the longitudinal side members $h$ by resilient metal strips $j$ so that its front edge can flex up and down with respect to the rest of the panel. A handle $k$ is secured to the underside of the front cross member $g$ at its centre, and at each side of the cross-member is secured a laterally projecting lug or catch $l$ adapted to engage with any one of a series of spaced recesses $m$ pressed in the upper flange of the guide channel $f$. When the front cross-member is in its normal raised position in which it is maintained by the spring strips $j$ the catches l are engaged in the recesses m as shown in Figure 4 and the panel is thus securely held against movement, the spring strips effectively preventing any tendency to rattle.

When it is desired to move the panel the front cross-member is pulled downwardly to disengage the catches l from the recesses m as shown in Figure 5, and the panel is then free to slide longitudinally but will be locked again as soon as the downward pull on the handle is released.

As the front of the panel rises through a short distance when released the upper surface of the front edge may be chamfered off or rebated as shown in Figure 6 to co-operate with a complementary flange or step on the fixed front rail of the roof to give additional protection from weather.

In the alternative construction illustrated in Figures 7 and 8 the whole of the sliding panel is depressed at its front edge to disengage the locking catches. For this purpose the front part of the panel is pressed upwardly by blade springs n secured to the underside of the panel at each side with their free ends bearing on the bottom of the recess at each side of the roof opening. The free ends of the springs may be provided with rollers o to reduce friction. The locking catches are formed by upwardly projecting tongues p which are carried by lugs q secured to the panel and are adapted to engage in notches in flanged guide strips r arranged along each side of the roof opening.

Figure 10:
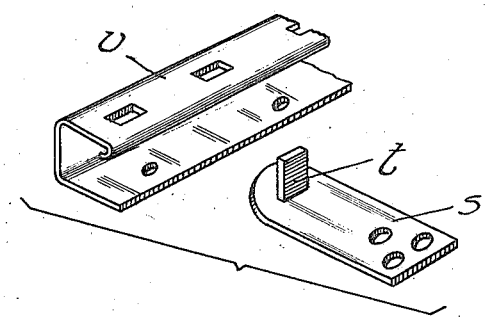

In the construction illustrated in Figures 9 and 10 the panel carries inwardly projecting lugs s with upstanding projections t adapted to engage in notches or gaps u pierced in the upper flange of a water-check frame v of channel section.

Figure 11:
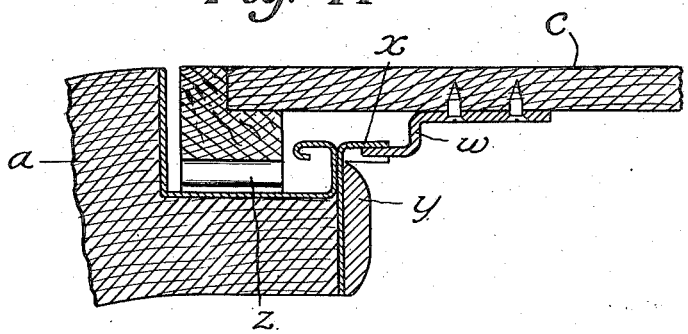
Figures 11 and 12 are respectively a fragmentary section and perspective view of a still further form of locking device applicable to existing sliding panels.
Figure 12:
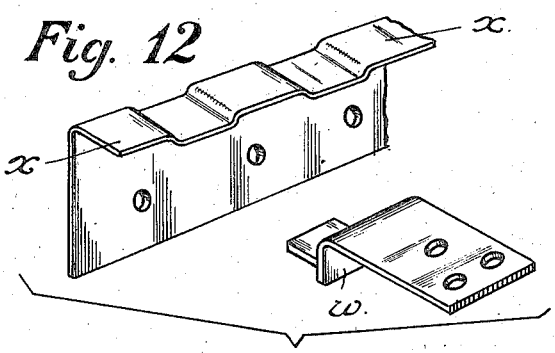

Figures 11 and 12 show a construction which can readily be applied to existing sliding roofs provided that they have already, or can be modified to have, some freedom for limited vertical movement. A lug w secured to the underside of the panel has an outwardly projecting tongue adapted to engage with indentations or steps in the horizontal flange of an angle strip x secured to the inner face of the sides of the roof opening, the strip x being concealed by a cover strip or bead y. This locking device can be fitted at both sides of the panel or at one side only as desired. Springs should be provided, as at z, tending to keep the tongues on the lugs normally in engagement with the indentations or steps of the strips x.

I claim:

1. An opening roof for vehicles, comprising an opening in the roof, a longitudinally and horizontally slidable panel for covering said opening, fixed means for guiding said panel in its sliding movement and for permitting a limited vertical movement of said panel, spring means resisting vertical movement of the panel in one direction, and locking means embodying a detent and socket for positively holding said panel in any one of several, longitudinal positions against movement in its plane, said locking means being engaged and disengaged by vertical movement of the panel against the action of the spring means.

2. An opening roof for vehicles, comprising an opening in the roof, a longitudinally and horizontally slidable panel for covering said opening, fixed means for guiding said panel in its sliding movement and for permitting a limited vertical movement of the front of the panel, spring means resisting vertical movement of the front of the panel in one direction, a detent on each side of the panel and a plurality of sockets on each side of the roof opening which detents and selected sockets are engaged and disengaged by vertical movement of the front of the panel and are normally held engaged by the spring means to positively prevent movement of the panel in its plane, and grasping means on the front part of the panel, said grasping means serving for moving the front of the panel vertically to disengage the catch members and for moving the panel longitudinally when the catch members are disengaged.

3. A sliding roof for vehicles, comprising an opening in the roof, a longitudinally and horizontally slidable panel for covering said opening, the front part of said panel being connected to the remainder by resilient strips which urge the front part in a downward direction, a detent on each side of the front part of the panel and a plurality of detent sockets on each side of the opening in the roof cooperating to positively hold the panel normally against longitudinal movement in its plane, in any of several selected positions, said catch members being disengaged by positive upward movement of the front part of the panel against the action of the resilient strips to allow the panel to be moved longitudinally and being automatically reengaged when the front part of the panel is released.

4. A sliding roof for vehicles, comprising an opening in the roof, a longitudinally and horizontally slidable panel for covering said opening, a flanged upstanding water-check frame extending around said opening, fixed means for guiding the sliding movement of the panel and for permitting a limited vertical movement of the panel, positive detents on the panel cooperating with recesses in the flanges of the water-check frame along the sides of the opening to positively hold the panel against movement in its plane, in any of several selected positions, spring means urging the panel vertically in one direction to cause the catch members to engage with the recesses and grasping means on the panel for moving it vertically against the action of said spring means to disengage the catches and for sliding it longitudinally when the catches are disengaged.

WILLIAM HENRY BISHOP.